United States Patent [19]

Myers

[11] 3,772,126
[45] Nov. 13, 1973

[54] APPARATUS AND METHOD FOR MAKING FIBERGLASS GRATING

[75] Inventor: Robert E. Myers, Houston, Tex.

[73] Assignee: M & M International Plastics, Inc., Houston, Tex.

[22] Filed: Oct. 21, 1971

[21] Appl. No.: 191,184

[52] U.S. Cl.............. 156/434, 156/180, 156/181, 156/441, 156/500, 264/137, 425/123
[51] Int. Cl... B32b 31/20, B65h 57/04, B65h 57/16
[58] Field of Search................... 156/393, 433, 434, 156/440, 441, 500, 175, 180, 148; 264/137; 425/123

[56] References Cited
UNITED STATES PATENTS

| | | | |
|---|---|---|---|
| 3,296,055 | 1/1967 | Wilkins | 156/433 |
| 3,425,884 | 2/1969 | Brinkema | 156/433 |
| 3,645,833 | 2/1972 | Figge | 156/175 |
| 3,086,576 | 4/1963 | Thaden | 156/433 |
| 3,692,607 | 9/1972 | Shobert | 156/180 |
| 3,551,237 | 12/1970 | Cox et al. | 156/175 |

Primary Examiner—Daniel J. Fritsch
Attorney—Richard C. Sughrue et al.

[57] ABSTRACT

Fiberglass strands are wetted with catalyzed resin and are passed to movable arms of a weaving machine which deposits two sets of spaced parallel strands in a slotted form so that the sets of strands cross each other at an angle. The formed grating is ejected from the form into a pre-heated mold of a press, where the grating is compressed and cured.

4 Claims, 9 Drawing Figures

Patented Nov. 13, 1973

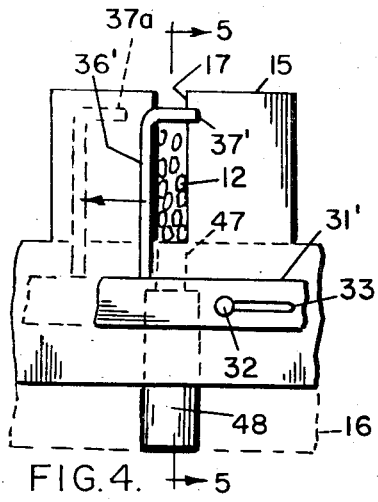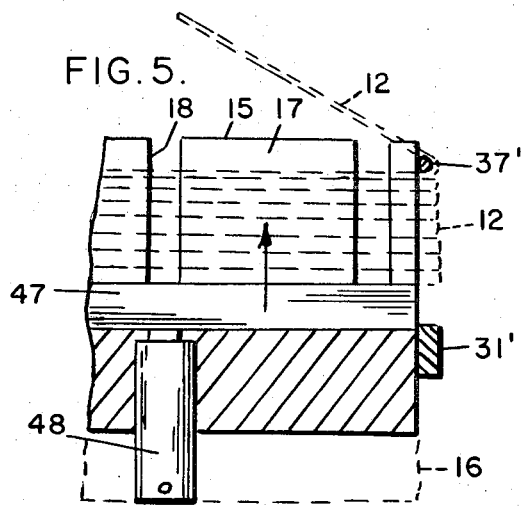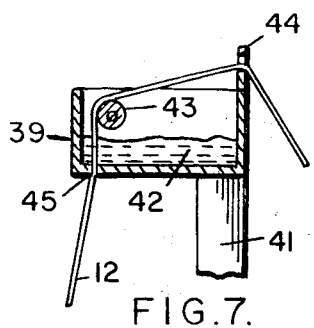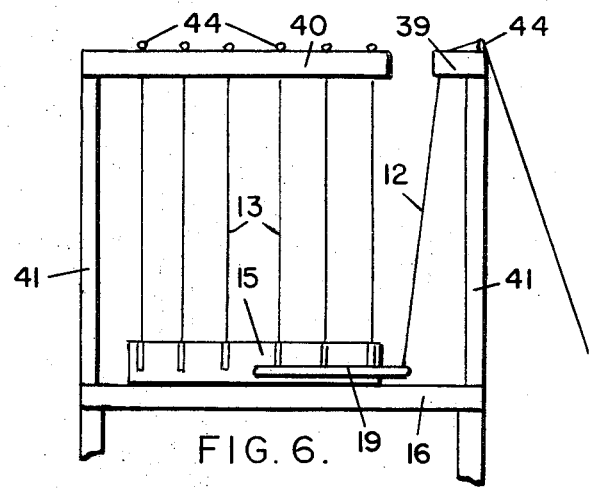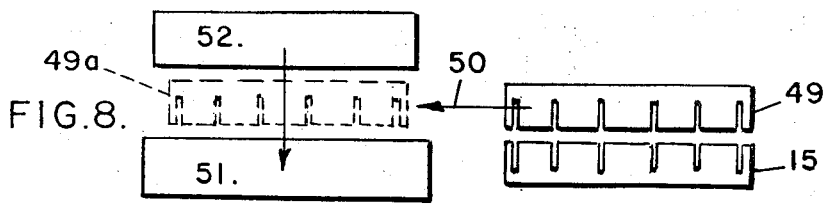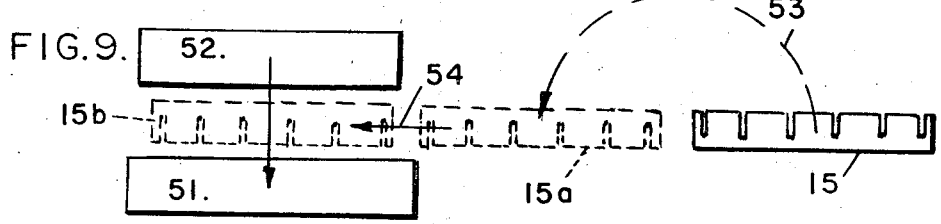

APPARATUS AND METHOD FOR MAKING FIBERGLASS GRATING

This invention relates to new and useful improvements in the art of making gratings of a determinate size from fiberglass strands, the expression "determinate size" being used here to distinguish from stock made in indeterminate or running length.

The principal object of the invention is to provide an apparatus and a method whereby fiberglass strands may be readily woven into the form of the grating in which two sets of spaced parallel strands cross each other at an angle.

Another important object of the invention is to treat the fiberglass strands with catalyzed resin prior to weaving thereof into the form of the grating, and then to quickly transfer the formed grating into a pre-heated mold of a press where the grating is compressed and the resin is cured in a highly expeditious manner.

As an alternative to treating the strands with resin prior to weaving, another object of the invention is to facilitate wetting the formed grating with resin in the pre-heated mold, so that here also the curing takes place almost instantly.

With the foregoing more important objects and features in view and such other objects and features which may become apparent as this specification proceeds, the invention will be understood from the following description taken in conjunction with the accompanying drawings, in which like characters of reference designate like parts, and in which:

FIG. 4 is a fragmentary elevational view of the weaving machine form, also showing one of the detents;

FIG. 5 is a fragmentary sectional view, taken substantially in the plane of the line 5—5 in FIG. 4;

FIG. 6 is a largely diagramatic elevational view of the weaving machine with the resin baths;

FIG. 7 is an enlarged sectional view of one of the resin baths;

FIG. 8 is a diagramatic illustration showing one manner of transferring the formed grating from the weaving machine to the molding press; and FIG. 9 is a view similar to FIG. 8 but showing an alternative manner of transferring the formed grating.

Figure 3:
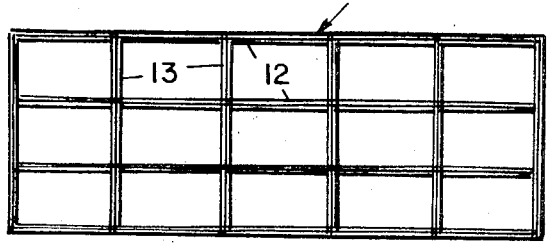
FIG. 3 is a plan view of the completed grating on a reduced scale with regard to FIGS. 1 and 2.

Referring now to the accompanying drawings in detail, FIG. 3 shows a completed grating designated as G, the same having a determinate size and consisting of one set of spaced parallel fiberglass strands 12 crossing with a second set 13 of such strands at an angle. In the illustrated instance the two sets of strands 12, 13 cross at right angles, but the angles may be acute or obtuse, as desired.

Figure 1:
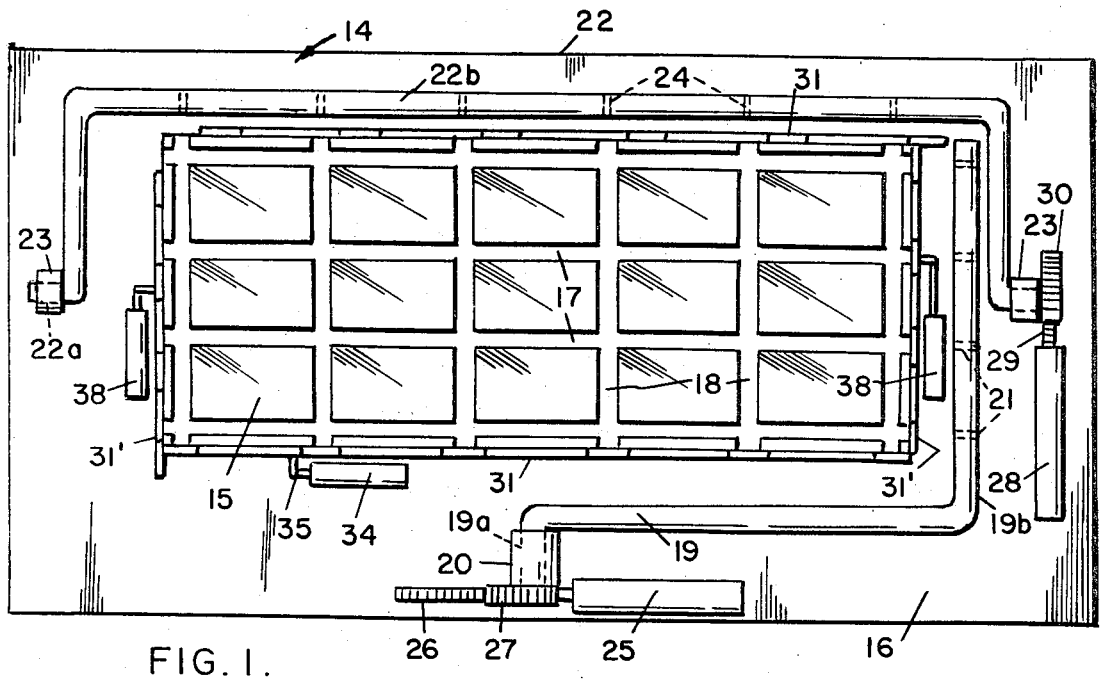
FIG. 1 is a plan view of the fiberglass strand weaving machine in accordance with the invention.
Figure 2:
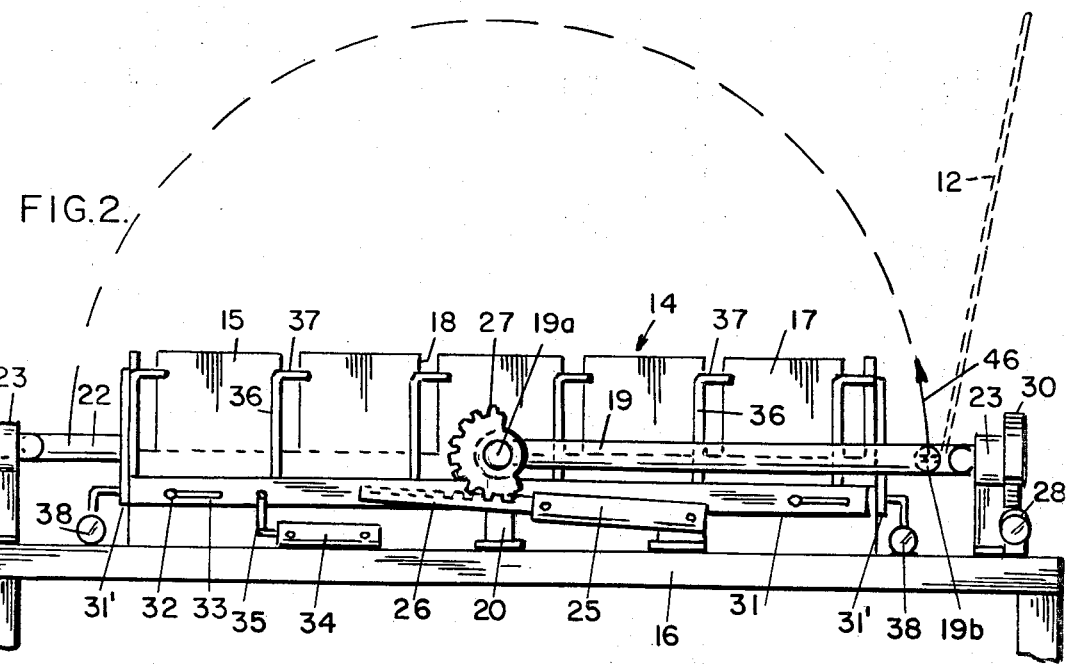
FIG. 2 is a side elevational view thereof.

The grating G is formed from fiberglass strands by a weaving machine designated generally as 14 in FIG. 1 and 2. The machine comprises a rectangular form 15 positioned on a supporting table 16, the form being provided with one set of spaced parallel open-ended slots 17 extending in one direction, and with a second set of spaced parallel open-ended slots 18 which intersect the slots 17 at the desired angular relationship, for example at right angles as shown.

A substantially L-shaped weaving arm 19 is swingable over the form 15 in a direction parallel to the slots 17, the arm 19 having a journal portion 19a supported in a bearing block 20 located on the table 16 centrally at one side of the form 15. The transverse portion 19b of the arm 19 is provided with a set of apertures 21 which are aligned with the respective slots 17 and are adapted to have threaded therethrough a set of fiberglass strands 12 so that when the arm 19 is swung back and forth over the form 15, these strands are deposited in a zig-zag manner in the slots 17.

Similarly, a second weaving arm 22 is swingable over the form 15 in a direction parallel to the slots 18, the arm 22 being substantially U-shaped and having journal portions 22a supported in bearing blocks 23 located on the table 16 centrally at the ends of the form 15. The bight portion 22b of the arm 22 is provided with a set of apertures 24 which are aligned with the respective slots 18 and are adapted to have threaded therethrough a set of fiberglass strands 13 so that when the arm 22 is swung back and forth over the form 15, these strands are deposited in a zig-zag manner in the slots 18.

The weaving arm 19 is oscillated over the form 15 by a fluid operator 25 which reciprocates a rack 26, the latter meshing with a gear segment 27 secured to the journal portion 19a of the arm 19. Similarly, the weaving arm 22 is oscillated by a fluid operator 28 which reciprocates a rack 29, the latter meshing with a gear segment 30 secured to one of the journal portions 22a of the arm 22. The fluid operators 25 and 28 are suitably mounted on the table 16.

Each side of the form 15 is provided with a bar 31 which is slidably held in position by fasteners 32 extending through slots 33 in the bar so that the bar is slidable on the form within limits afforded by the slots 33. The sliding of the bar is effected by a fluid operator 34 mounted on the table 16 and connected to the bar as by a link 35. The bar 31 carries a set of upwardly extending fingers 36 provided at their upper end with horizontal detents 37 which extend across the open ends of the slots 18 in the form 15 when the bar 31 is slid in one direction, as for example to the position shown in FIG. 2. However, when the bar is slid in the opposite direction, the detents 37 leave the ends of the slots open. As already stated, the bar 31 and detents 37 are provided at each side of the form, that is, at both ends of the slots 18. Similar bars 31' with fingers 36' and detents 37' are provided at the ends of the form 15 for the open ends of the slots 17. FIG. 4 shows one of the bars 31' slid to a position where the detent 37' extends across the open end of the slot 17. When the bar is slid in the opposite direction, the detent 37' leaves the end of the slot open, assuming the position indicated by the dotted lines 37a. The bars 31' are slid by fluid operators 38 mounted on the table 16.

Before the fiberglass strands 12, 13 are handled by the respective weaving arms 19, 22 they are wetted by catalyzed resin contained in baths or tanks 39, 40. These are disposed at some elevation above the table 16 and supported by suitable standards 41, as indicated in FIG. 6. The two tanks are of the same construction and FIG. 7 shows the tank 39 containing catalyzed resin 42, above the level of which is a roller 43. The set of fiberglass strands 12 pass through eyes 44 provided at the upper edge of the tank, then over the roller 43 and downwardly through the resin 42, leaving the tank through apertures 45 in the bottom of the tank. The fiberglass strands are thus wetted with resin and the size of the apertures 45 determines the proportion of resin to fiberglass.

In operation, the strands 12 are fed from supply rolls (not shown) through the resin tank 39 and through the apertures 21 in the weaving arm 19. Similarly, the strands 13 are fed through the resin tank 40 and through the apertures 24 in the weaving arm 22. Assuming the arm 22 to be stationary and the arm 19 in the position shown in FIG. 2, and also assuming the slots 17 in the form 15 to be open at both ends, the arm 19 is swung by the operator 25 in the direction of the arrow 46 to the opposite end of the form, carrying the strands 12 with it. At that end of the form, which is the left-hand end as seen in FIG. 2, the detents 37' are projected across the ends of the slots 17. The arm 19 is then returned to its initial position at the right-hand end of the form, this causing the strands 12 to hook around the projected detents at the left-hand end so that by the time the arm 19 reaches the right-hand end, stretches of the strands 12 are deposited in the slots 17.

The detents 37' at the right-hand end are then projected and when the arm 19 is again swung to the left-hand end, the strands 12 become hooked around the projected detents at the right-hand-end, as will be apparent from FIG. 5. In the meantime, the detents at the left-hand end are retracted so as to permit depositing of the next stretches of strands 12 in the slots 17.

When the back and forth movement of the arm 19 has deposited two successive stretches of the strands 12 in the slots 17, the arm 19 remains stationary. However, the arm 22 is then energized so as to deposit two successive stretches of the strands 13 in the slots 18, the strands 13 extending across the strands 12 at the junctions or intersections of the slots. This completes one cycle of operation and the procedure is repeated by alternate actuation of the arms 19, 22 until the slots 17, 18 are filled with stretches of the strands up to the level of the detents. The strands in the slots are then severed from the weaving arms so that the thus far completed grating may be removed from the form 15.

FIGS. 4 and 5 show the bottom portion of the form 15 as being provided with an ejector grid which is normally flush with the bottom of the slots 17, 18, but may be pushed upwardly into the slots by a fluid operator 48, the grid being indicated at 47. As the grid moves upwardly in the slots, it ejects the grating upwardly from the form 15. The grating ejected from the form is still wet with resin and must be rapidly transferred into a mold of a press for compression and curing. FIG. 8 diagramatically shows one manner in which this may be done, involving a transfer device 49 which is disposed immediately above the form 15. The transfer device 49 is similar in construction to the form 15 and is similarly slotted, but is in an upside down position above the form 15 so that when the grating is ejected from the form, it is received in the slots of the transfer device. The device 49 is slidably or movably mounted in any suitable manner and when the grating is received therein, the device 49 is moved at indicated at 50 to a position indicated by the dotted lines 49a where it is disposed immediately above the mold 51 of a press 52. The device 49 is also provided with an ejector grid, like the grid 47 of the form 15, and when the device is in the position 49a, the ejector grid thereof is actuated so that the grating is deposited into the mold 51. The device 49 is then returned to its initial position and the press 52 is actuated to compress the grating in the mold.

It is significant to note that the mold 51 is pre-heated so that when the grating is compressed therein, the resin becomes cured. Gel time of the catalyzed resin in the heated mold is approximately 15 seconds, and thus it is important to place the wet grating into the mold quickly, once the grating is in position over the mold. Gel time of the resin without the heat of the mold is several hours.

FIG. 9 diagramatically shows another arrangement for transferring the grating from the weaving form 15 to the mold 51 of the press 52. In this instance the need for a transfer device such as the device 49 is eliminated and the form 15 is mounted on hinges or the like, so that it may be turned over or upside down as indicated by the arrow 53 to the position shown by the dotted lines 15a. In that position the inverted form is slid or otherwise conveyed as at 54 to the position 15b directly above the mold 51, and the ejector grid 47 of the form is then actuated to discharge the grating downwardly from the form into the mold.

While it is preferred to wet the fiberglass strands 12, 13 in the tanks 39, 40 prior to handling of the strands by the weaving arms 19, 22, so that the weaved grating is wet at the time of its transfer into the mold 51, it is also possible to weave the fiberglass strands in a dry condition and to transfer the dry grating into the mold. In such instance the grating is wetted in the mold, for subsequent compression and curing.

While in the foregoing there has been described and shown the preferred embodiment of the invention, various modifications and equivalents may be resorted to within the spirit and scope of the invention as claimed.

What is claimed as new is:

1. An apparatus for making a grating of a determinate size from fiberglass strands, said apparatus comprising: a form provided with one set of spaced parallel open-ended slots and with a second set of spaced parallel open-ended slots intersecting the slots in the first set at an angle, a first weaving arm movable over said form in a direction parallel to the first set of slots, a second weaving arm movable over the form in a direction parallel to the second set of slots, said weaving arms being adapted to handle sets of fiberglass strands and to deposit them in a zig-zag manner in the respective slots so that the sets of strands alternately cross each other at the intersections of the slots, means for moving said arms back and forth over said form in alternate succession, projectable and retractable detents provided on said form at the open ends of said slots, said detents being engageable by the fiberglass strands to facilitate the zig-zag depositing of the strands in said slots, and means for projecting and retracting said detents in coordination with the movement of said arms.

2. The apparatus as defined in claim 1 further comprising means for treating the fiberglass strands with catalyzed resin prior to handling of the strands by said weaving arms.

3. The apparatus as defined in claim 3 further comprising a molding press having a pre-heated mold in which the grating formed in said form is deposited for purposes of curing and compression.

4. The apparatus as defined in claim 1 further comprising means provided in said form for ejecting a formed grating from said slots.

* * * * *